UNITED STATES PATENT OFFICE.

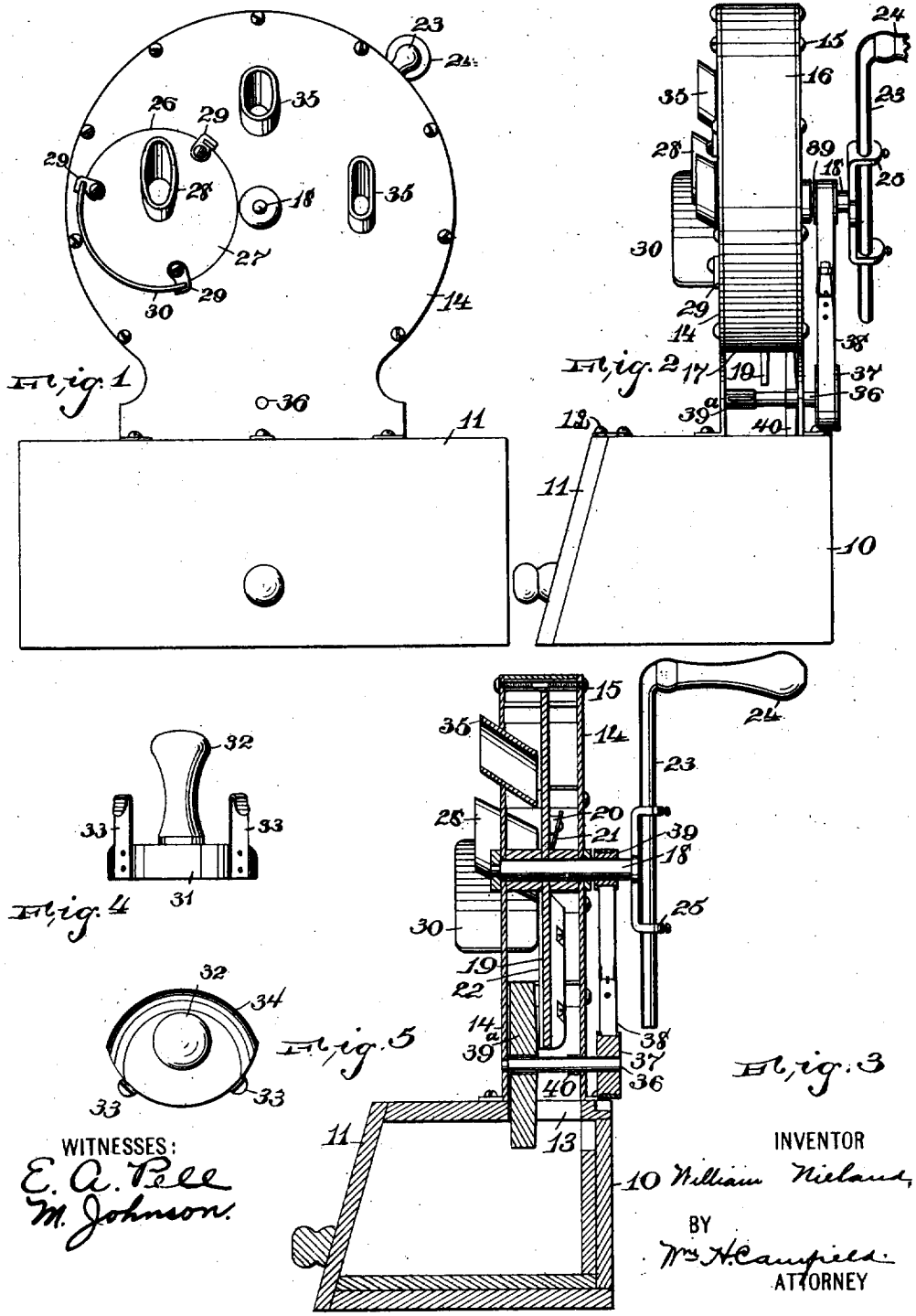

WILLIAM NIELAND, OF NEWARK, NEW JERSEY.

VEGETABLE-CUTTER.

No. 903,307. Specification of Letters Patent. Patented Nov. 10, 1908.

Application filed May 7, 1908. Serial No. 431,306.

*To all whom it may concern:*

Be it known that I, WILLIAM NIELAND, a citizen of the United States, residing at Newark, in the county of Essex and State of New Jersey, have invented certain new and useful Improvements in Vegetable-Cutters; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved vegetable cutter that comprises a casing in which is arranged a revolving disk having blades arranged at an angle thereto, which blades are adapted to be adjustable so as to vary the depth of a slice or cut taken from a vegetable, the slices being fed from the casing and dropping by gravity into a receptacle arranged underneath the casing, the receptacle being arranged to slide within a support for the casing.

A further object of the invention is to provide a series of wings driven when the knife is driven and connected with the knife shaft, whereby any adhering slices are caused to be cleaned from the knife disk and the knives so that clogging of the knives is not possible.

Another improved feature of this device is the openings for feeding vegetables which are inclined at an angle to the axis of the cutter, and to the blades thereof, so that an oblique cut can be made in the vegetable, and in the case of beans and similar vegetables with a long formation, a diagonal cut is the result, similar to the hand cut beans.

The invention is illustrated in the accompanying drawing, in which

Figure 1 is a face view of the machine, and Fig. 2 is a side view thereof. Fig. 3 is a vertical section of the machine taken centrally. Figs. 4 and 5 are a side and top view of a handle used in conjunction with the machine for feeding large vegetables.

The invention consists of a base 10 which forms a support for the casing to be hereinafter described, and also acts to receive the drawer 11 which is adapted to receive the slices and cuts from the vegetable and similar articles fed through the machine, the drawer sliding in the support and adapted to be fastened by a hook 12. The casing is mounted over the base, the casing being arranged over an opening 13 in said base, the casing comprising parallel plates 14 which are substantially circular and fastened together by the screws 15 and being bridged by an annular ring 16 which incloses the cutter, along with the plates 14, and completes the casing, except at the bottom 17 where it is open to allow the slices to fall through into the drawer 11. A shaft 18 is centrally mounted in the casing, and is fitted with a disk 19 having the blocks 20 on the back thereof, which blocks are equipped with the knives 21, the faces of the blocks being arranged at an angle so as to tip the blades 21, the blades projecting through slots in the disk 19 and having their cutting edges 22, as shown in Fig. 3, regulated as to the depth of the cut, the slice, when it is cut, and the edge of the vegetable before it is cut resting on the face of the disk 19. A rod 23 with a handle 24 fits into a yoke 25 on the shaft 18, and provides for the manual operation of the shaft and consequently the cutters.

As shown in Fig. 3 a large opening 26 is provided with a cover 27 in which is a chute 28, this chute being preferably inclined as shown in Figs. 2 and 3, the plate 27 being held by the catches 29, the front plate 14 having a shelf 30 concentric with the opening 26, thereby providing means for resting larger vegetables, such as potatoes, turnips and the like, and feeding them in through the large opening 26 to be sliced successively by the cutter-blades when they revolve.

To prevent injury to the fingers of an operator, each vegetable can be guided, when it is nearly cut, by the succeeding one, but when the last vegetable is being used I provide a holder 31 comprising a flat disk with a handle 32, and having spring arms 33 which fit on the shelf 30 and guide the plate 31 through the opening 26. The edge 34 opposite the spring arms 33 is rounded or beveled, since that edge is toward the direction from which the knives come and there is no sharp edge to engage the knives to cause any of them to be broken.

The front plate 14 is provided with other chutes 35 which are also inclined to the axis of the cutters to provide the oblique cut in vegetables, thus supplying a multiplicity of openings for long vegetables, such as string beans, whereby more than one person can feed the machine and facilitate the cutting of this class of vegetable.

Parallel to the shaft 18 is a second shaft 36 which is provided with a pulley 37, and a belt 38 passes over this pulley and serves to drive it from the pulley 39 on the shaft 18. The shaft 36 is provided with wings 39ª and 40 on each side of the cutter disk 19 and adapted to come in close contact with the front and the back of the knives, and when these wings are rotated, when the machine is operated, they pass the knives in a direction opposite to the path of travel of the blades and sweep from the cutters such slices as have not dropped by gravity, and thus prevent clogging of the disk 19 and its cutters with cut slices. This keeps the casing clean on the inside, and when the cutting is completed, a few turns of the cutter-blades will take all the slices from the disk and the blades.

This apparatus is a handy household utensil, is inexpensive, and provides a machine for cutting string beans and like vegetables, which has heretofore usually been done by hand and is a tedious process.

Having thus described my invention, what I claim is:—

1. A vegetable cutter comprising a base, a casing mounted on the base, the base and casing being in open communication, a drawer in the base, a rotatable shaft in the casing having cutter-blades thereon, one face of the casing having an opening therein, a shelf under the opening for supporting vegetables, a cover for the opening, and means for securing the cover in place, the cover having a chute therein, the chute being arranged at an oblique angle to the path of travel of the blades.

2. A vegetable cutter comprising a base having an opening in its top, a casing having an opening in its bottom arranged on the base over the opening therein, a shaft rotatably arranged in the casing, cutter-blades on the shaft, means on the shaft for rotating it, a second shaft parallel to the cutter shaft, pulleys on the shafts, a belt connecting the pulleys, wings on the second shaft adapted to rotate adjacent to the blades to sweep slices from the blades, a series of openings in the face of the casing, chutes in the openings and projecting from and also within the casing with their inner edges adjacent to the cutter-blades, and a drawer in the base.

3. The combination of a vegetable cutter having a casing with cutting mechanism therein, the casing having an opening for the reception of vegetables, and a shelf underneath the opening, with a disk having a handle on one face, spring arms extending backwardly on one edge, the edge with the spring arms being concentric to the shelf on the casing and adapted to be guided thereby, the edge of the disk opposed to the spring arms having a beveled edge toward the knives.

In testimony, that I claim the foregoing, I have hereunto set my hand this 6th day of May 1908.

WILLIAM NIELAND.

Witnesses:
WM. H. CAMFIELD,
FRANK NIELAND.